(12) United States Patent
Sherwood

(10) Patent No.: US 6,931,305 B2
(45) Date of Patent: Aug. 16, 2005

(54) APPARATUS FOR MONITORING AND CONTROLLING PUMP AND VALVE SYSTEM OPERATIONS

(75) Inventor: Randall L. Sherwood, Suisun, CA (US)

(73) Assignee: Spillguard Technologies, Inc., Concord, CA (US)

( * ) Notice: Subject to any disclaimer, the term of this patent is extended or adjusted under 35 U.S.C. 154(b) by 0 days.

(21) Appl. No.: 09/877,958

(22) Filed: Jun. 8, 2001

(65) Prior Publication Data

US 2002/0188382 A1 Dec. 12, 2002

(51) Int. Cl.[7] .............................. G05D 7/00; F04B 15/00
(52) U.S. Cl. .............................. 700/282; 702/45; 700/9; 700/283
(58) Field of Search .............................. 700/9, 281–285; 702/45; 137/455, 392–395, 487.5; 73/1.16, 1.35, 1.37, 1.44, 1.83; 701/29; 340/616, 618, 619; 141/1, 16, 21

(56) References Cited

U.S. PATENT DOCUMENTS

| | | | |
|---|---|---|---|
| 4,072,934 A | * | 2/1978 | Hiller et al. ................. 340/243 |
| 4,440,239 A | | 4/1984 | Evans |
| 5,225,813 A | * | 7/1993 | Raub, Sr. .................... 340/623 |
| 5,507,326 A | * | 4/1996 | Cadman et al. ............. 141/198 |
| 5,586,050 A | * | 12/1996 | Makel et al. ................ 364/509 |
| 5,762,118 A | * | 6/1998 | Epworth et al. ............. 141/198 |
| 5,956,259 A | * | 9/1999 | Hartsell, Jr. et al. ..... 364/528.37 |
| 5,966,311 A | | 10/1999 | Stemporzewski, Jr. et al. |
| 6,078,850 A | | 6/2000 | Kane et al. |
| 6,230,091 B1 | | 5/2001 | McQuinn |
| 2001/0037839 A1 | * | 11/2001 | Litt ............................. 141/234 |

* cited by examiner

Primary Examiner—Leo Picard
Assistant Examiner—Sean Shechtman
(74) Attorney, Agent, or Firm—Squire, Sanders & Dempsey

(57) ABSTRACT

A centralized monitoring and control unit for a fluid transfer facility has a connective interface providing signal connectivity to overfill and ground circuitry in individual fill lanes, to pump and valve control circuitry, and to individual ones of input mechanisms, and executable logic routines for monitoring input at the connective interface, and for providing output signals through the connective interface to external devices and equipment including at least the pump and valve control circuitry, the input mechanisms for input of fill parameters, and to the one or both of overfill and ground monitoring circuits.

17 Claims, 9 Drawing Sheets

APPARATUS FOR MONITORING AND CONTROLLING PUMP AND VALVE SYSTEM OPERATIONS

FIELD OF THE INVENTION

The present invention it is in the field of fluid transfer control systems, and has particular application in the area of monitoring conditions of pump and valve operation in such systems, and in providing protective controls.

BACKGROUND OF THE INVENTION

The need for safe and efficient storage, delivery and transport of petrochemical or other types of fluids has driven much investment in engineering technology that has provided many solutions greatly improving these aspects of the processes involved. Current systems for storage and delivery of such fluids incorporate state-of-the-art electronic equipment for monitoring and controlling pump operations, and may utilize multiple product storage tanks supplying pump stations capable of serving several separate pumping operations and products simultaneously in a single load lane.

Such monitoring and control systems of current art are, in most applications, employed as separate monitoring and control units, and in a typical load lane for petroleum product transfer, for example, separate units for overfill prevention and vehicle static grounding verification are utilized that monitor various functions and conditions for safe operation, and can interrupt fluid flow if the conditions are not met. Separate sets of such units are used for monitoring sensors on the mobile tank, and for the base and delivery pump and valve operations, are typically mounted, sometimes with additional other monitoring or control units, on a loading rack located remotely from the pumping and metering area.

When an unsafe condition exists in either the fluid flow or grounding condition, pulsed signals are interpreted by the monitoring and control units, and command signals are sent to stop fluid flow by closing valves, disrupting the power to a pump or some other precautionary action. Interpretation by the monitoring and control units of the pulsed signals from sensors on the transport vehicle or pump station is based on preset information, some of which is input through a transport vehicle driver interface. The preset data assumes that mechanical valves and other equipment are in good condition and are properly tuned or adjusted and functioning as designed.

Whether a preset is of an older mechanical type with electrical output, or is of a more recent electronic design handling multiple pump components, a control valve, for example, that has not been properly adjusted or otherwise malfunctions, creates a potential hazard to a large surrounding area due to the high fluid flow rate and pressure. In current systems a valve failure in one lane may present a hazard to other nearby operating pumping lanes that are served by separate sets of pumps, valves and controllers, because the separate sets of controllers monitoring the lane receive no signals that indicate a problem, and are thereby unaffected by the control commands in the lane with the malfunctioning valve. The unaffected lane will continue to operate normally under the hazardous conditions presented by the problem lane.

In systems of current art, the preset values and parameters for loading assume that all of the valves, meters, and other equipment are adjusted, tuned and functioning properly. Another problem is presented, however, in such systems because an overfill condition is possible when a control valve is out of adjustment or does not function properly for whatever reason. For example, when a driver of a tank vehicle enters data into the preset interface, the amount of product to be transferred to a given compartment, for example, the amount is based on the known capacity and overfill sensing point of the destination compartment. If an error is made when a driver enters such preset data, or a control valve that is out of adjustment is not known by the preset, the monitoring and control system may not be able to shut down the pump and valve quickly enough to avoid a spill, once the overfill signal from the probe is received.

Another problem is presented in the area of leakage detection for control valves in systems of current art utilizing an electronic preset. For example, if recent maintenance or electronic board replacement has been performed on the preset, and the preset has not been properly reconfigured to provide the correct alarm when leakage occurs, the leakage, whether intentional or accidental in nature, may not be detected, resulting in product loss.

For safety reasons it is highly desirable in a petroleum or petrochemical product storage and transfer operation to have the capability of globally shutting down pumping and loading operations as quickly as possible if a hazardous condition such as overfill or static ground loss exists. It is also desirable to be able to detect a slow leak in one pump in a set of several operating pumps which are monitored and controlled by the same monitoring and controlling units set, particularly when an electronic preset is not properly reconfigured for providing a leakage alarm signal to the monitoring and controlling units set.

What is clearly needed is a fail-safe method and apparatus for monitoring and controlling various critical aspects of pump and valve operations, having global control capability in both the storage and delivery systems, and providing such controls in much less time than is achievable utilizing current monitoring and controlling systems. Such an improved method and apparatus provides comprehensive, centralized interpretation of operational pulsed signals, verifies static ground, detects product overfill conditions or leakage at various rates, and provides increased visibility to management when a problem in the pumping or delivery system occurs. Such an improved monitoring and controlling apparatus is also capable of continually monitoring several individual meter pulses and pump commands simultaneously, and is compatible with most modem electronic monitoring and control systems currently employed in the field, and can also be configured to be compatible with a variety of other modern monitoring and control systems. Such improved method and apparatus is described below in enabling detail.

SUMMARY OF THE INVENTION

In a preferred embodiment of the present invention a centralized monitoring and control unit is provided for a fluid transfer facility comprising one or more remote product storage tanks each having a base valve, a product pump and a flow-control valve in fluid conduits leading from individual ones of the remote storage tanks to two or more fill lanes, pump and valve control circuitry dedicated to controlling the pumps and valves, and individual ones of the fill lanes having an input mechanism for input of fill parameters, and one or both of overfill and ground monitoring circuits connectable to mating connectors and sensors on a vehicle to be filled in a lane. The unit has a connective interface providing signal connectivity to the overfill and ground circuitry in individual ones of the fill lanes, to the pump and valve control circuitry, and to individual ones of the input mechanisms; and executable logic routines for accepting and monitoring input at the connective interface, and for providing output signals through the connective interface to external devices and equipment including at least the pump and valve control circuitry, the input mechanisms for input of fill parameters, and to the one or both of overfill and ground monitoring circuits. The unit is characterized in that the centralized monitoring and control unit, through continuing execution of the executable logic routines, monitors conditions of the overall system, and automatically inhibits flow of fluids for specific pre-programmed conditions as monitored at the connective interface.

In preferred embodiments one or both of input and output signals to and from remote equipment and the centralized monitoring and control unit are accomplished via a wireless communication system. In some embodiments the wireless communication system is an RF system, utilizing RF transfer and receive equipment in the centralized monitoring and control unit.

In certain embodiments of the monitoring and control unit the output signals include signals to remote alert equipment, and the centralized monitoring and control unit sends activating signals to the alert equipment in response to conditions of the overall system as determined by the centralized monitoring and control unit through execution of the logic routines. The alert equipment can include one or both of audio and visual alert apparatus positioned in various places throughout the fluid transfer facility.

In some embodiments there is a display for displaying status and conditions of the fluid transfer facility. The display may include ground conditions at fill lanes, and real-time flow rates in individual ones of the fluid conduits of the fluid transfer facility. In some cases there is at least a red and a green visual alert indicator for providing a general indication of the status of conditions in the fluid transfer facility. In addition there may be one or more manual inputs for immediate shutdown of one or more functions in the fluid transfer facility.

In the various embodiments of the invention described in enabling detail below, for the first time a general and comprehensive intelligent system is provided to enhance the efficiency, accuracy and safety of fluid transfer facilities, in particular those that transfer explosive and hazardous materials, such as fuel products.

BRIEF DESCRIPTION OF THE DRAWING FIGURES

FIG. 3b is a side view of the control monitor unit of FIG. 3a.

FIG. 3c is a rear view of the control monitor unit of FIG. 3a.

FIG. 3d is a bottom view of the control monitor unit of FIG. 3a.

DESCRIPTION OF THE PREFERRED EMBODIMENTS

Figure 1:
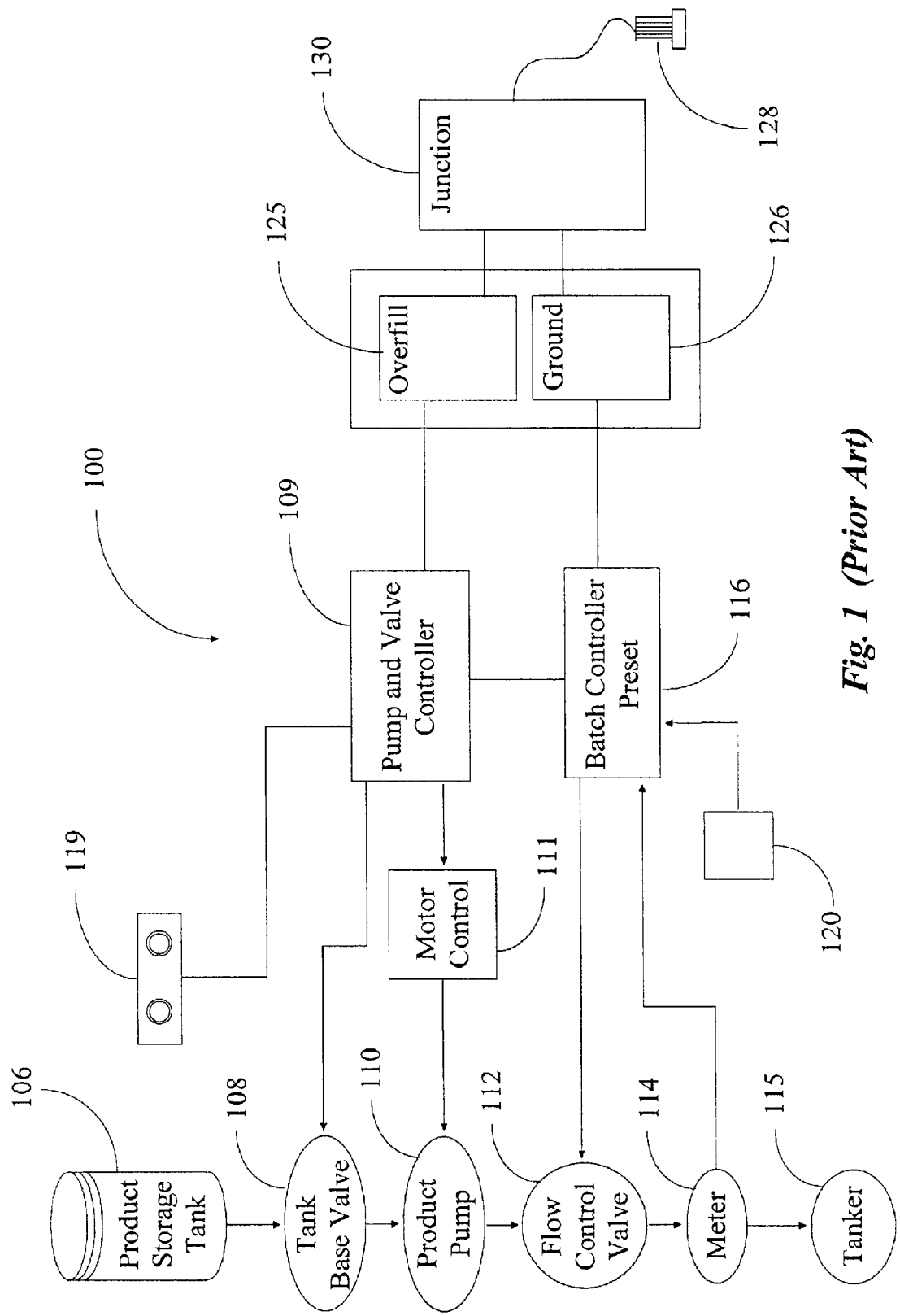
FIG. 1 is a simplified block diagram of a typical fluid transfer operation and electronic monitoring and control system according to current art.

FIG. 1 is a simplified block diagram of a typical fluid transfer electronic monitoring and control system according to prior art. System 100 represents a fluid storage and transfer operation such as is used for the loading of petroleum or petrochemical products into the storage compartments of a tank truck or rail tank, for example. System 100 has a product storage tank 106 which may be a plurality of storage tanks, each containing a separate fluid product. Each product storage tank 106 has a tank base valve 108 serving as the main tank shut-off valve, and a product pump 110 for pumping the product to a terminal in a loading lane where it is transferred into the compartment of the vehicle storage tank. In some systems a succession of additional product pumps may be utilized for a given product storage tank to meet the flow rate demand of multiple loading lanes simultaneously pumping the same product from one storage tank.

A pump and valve controller 109 has control circuitry which sends signals for controlling either the tank base valve 108 or the product pump 110, or both, based on a number of different inputs known in the art, some, but not all of which are shown in this figure. Various systems of current art similar to that shown in FIG. 1 may have some or all of the inputs shown. Control signals sent from pump and valve controller 109 are sent to a motor control 111 having circuitry that controls product pump 110. If all of the necessary input signals to pump and valve controller 109 are not in the proper state, the transfer of fluid from the product storage tank 106 is inhibited or stopped completely, thereby avoiding a hazardous overfill condition. A manual system for closing product pump 110 is provided by a pump shutdown buttons 119, located at the loading lane and connected through wiring to pump and valve controller 109. If a hazardous condition exists requiring product pump 110 to be shut down, a condition such as overfill, for example, the activation of pump shutdown buttons 119 serves as an emergency system for shutting down product pump 110. When activated, pump shutdown buttons 119 provide a signal for cutting the power to product pump 110, thereby stopping its operation. In this example, the manual pressing of pump shutdown buttons 119 provide the signal for shutting down product pump 110. An additional manual switch (not shown) is also commonly used in many systems for the purpose of ensuring that the operator of the flow control valve, while loading product into a vehicle tank storage compartment, is always present while the fluid transfer is taking place. Such a manual switch is located at the loading terminal, and must be manually held in a closed position by the operator of the terminal pump during the entire fluid loading (or unloading) process.

A flow control valve 112 controls the volumetric rate at which the fluid is being pumped into the destination compartment of the vehicle tank. Flow control valve 112 responds to upstream pressure from product pump 110, and operates using both a downstream and upstream electric solenoid valve. The downstream solenoid valve has an outlet connected to downstream piping, and under normal conditions when fluid is not being transferred the downstream solenoid of flow control valve 112 remains in a closed position. The upstream solenoid of flow control valve 112 is connected to upstream piping connected to the product pump, and in normal conditions when fluid is not been transferred the upstream solenoid valve is in an open position. Because of the nature of its design, flow control valve 112 in the system shown, and in other similar systems, must be periodically and routinely adjusted in order to ensure that it closes quickly and properly during operation. If flow control valve 112 is out of adjustment an excessive amount of fluid may pass through the valve once the signal to close the valve is received, thereby creating a hazardous overfill condition. It is also possible, due to the design of flow control valve 112 and configuration of its upstream and downstream solenoid valves, for a terminal pump operator to slowly bleed product from the system, and such product theft may not be known or detectable by the system or management.

The operation and flow rate of flow control valve 112 is controlled by a batch controller preset 116. Batch controller preset 116 has circuitry for controlling flow control valve 112, and for monitoring pulsed signals from a flow meter 114 which measures the amount and rate of product flow from the flow control valve 112. In various examples of systems such as system 100, batch controller preset 116 may be of an older mechanical design, or of current electronic design having intelligence provided by programmable firmware, or the like. A separate flow control valve 112 and flow meter 114 are associated with each separate product storage tank, tank base valve and product pump. During the fluid transfer operation flow meter 114 provides pulsed signals to the batch controller preset 116 for monitoring and analysis. Batch controller preset 116 has intelligence provided by an internal processor, and contains data pertaining to system operation, adjustment and mechanical condition of pumps and valves, as well as other pertinent system information. Additional data such as vehicle tank compartment storage capacity or driver or vehicle identification, or other data pertaining to the loading operation may be manually entered by the driver of the tank vehicle into batch controller preset 116. An interface 120 allows the driver or operator of the loading terminal to enter such information into batch controller preset 116.

In a typical system of current art such as is shown by FIG. 1, the batch controller preset 116 may have multiple components controlling a number of separate products and associated product storage tanks, valves and pumps. For reasons of simplicity, only one batch controller preset and only one set of product storage, valves, pumps and meter are shown in this figure. However, each loading lane in a typical storage and pump operation such as shown may have multiple sets of components that supply multiple products, allowing an operator to load multiple separate products into separate compartments of a vehicle storage tank simultaneously in one loading lane. In this example the vehicle storage tank, which may contain multiple storage compartments of varying capacity, is represented as tanker 115. In some modem petroleum or petrochemical pumping and loading operations, as many as eight (8) separate sets of components may exist serving a given loading lane.

In this example additional safety equipment is incorporated into the storage and pumping operation represented by system 100 and is connected to pump and valve controller 109 and batch controller preset 116 providing a system for monitoring the operational status, flow properties and other conditions of the system operation, as well as those of the destination tank vehicle. An overfill prevention unit 125 is connected by wiring to pump and valve controller 109 having circuitry that provides output control signals to motor control 111 which in turn controls the operation of product pump 110. Overfill prevention unit 125 is also connected to batch controller preset 116, either through pump and valve controller 109 such as it is shown in this figure, or possibly by direct connection through other circuitry in some other systems. Overfill prevention unit 125 is used for detecting an overfill condition, typically that of a top or bottom loading tank vehicle, and provides output control signals to various components of the loading operation.

In system 100 pulsed signals continuously check system operation of the pump and valve controller as well as wiring, connections and sensors on the tank vehicle, and are continuously monitored by overfill prevention unit 125. Overfill prevention unit 125 is designed to be connected to the tank vehicle using a plug assembly 128 comprising of a cable and plug which is designed for standard connection to a receptacle on the tank vehicle, and in this example is connected to overfill prevention unit 125 through a junction 130. Junction 130 is a standard junction box containing a terminal board for interconnecting one or more monitoring or control units. Pulsed signals from fluid level sensors in different storage compartments of the tank vehicle are monitored by overfill prevention unit 125 through the connection to the tank vehicle as described. If an overfill sensor comes in contact with liquid, or a failure occurs somewhere in the system, the pulsed signals will cease, causing overfill prevention unit 125 to interrupt the power to pump and valve controller 109 and batch controller preset 116, or otherwise signal for the shutdown of the fluid loading operation, thereby shutting down pumps, valves, terminal systems and possibly other components or systems.

The possible occurrence of an electric arc caused by static electric discharges in the vicinity of flammable fluid, such as petroleum, during a tanker loading process is a particular safety concern for such an operation, and is addressed by ensuring that a common ground between the truck and the loading terminal is constantly maintained during the loading process. Static ground verification is provided by a ground detection unit 126, having circuitry that verifies the common ground and stops the fluid flow if the ground is lost by cutting power to either or both pump and valve controller 109 and batch controller preset 116. Ground detection unit 126 has connectivity to pump and valve controller 109 and batch controller preset 116, similarly to that of overfill prevention unit 125, and is also similarly connected to plug assembly 128 through junction 130 for connection to the receptacle on the tank vehicle.

In this example one control unit may provide monitoring and control of pump and valve operation for the product storage system through connection utilizing a set of circuitry that is different from the circuitry used for connection to terminal pump operations in the load lane. In some other cases one set of connection circuitry may be used for connecting one control unit to the components it serves, while a different set of connection circuitry may be used for connecting a second control unit to the components it serves. In such cases in previous art where the additional circuitry is utilized, whether the components served are of state-of-the-art electronic design or are components of older design and mechanical in nature, the resulting problem is a delay in the reaction time of the controllers to shutdown the valves or pumps or other systems once a pulsed signal ceases, or otherwise is interpreted by the controllers as indicating a problem or hazardous condition requiring a system shutdown.

In the example presented in FIG. 1 overfill prevention unit 125 and ground detection unit 126 are contained within a protective enclosure standard in the industry, and are mounted with junction 130 at the loading rack or fill station, near where tanker trucks would be located in the loading lane during a loading operation. The proximity of the mounted control monitors and junction to the tanker trucks is such that connection can be made between junction 130 and the sensor receptacle of the tank vehicle by plug assembly 128. In the example given for system 100, overfill prevention unit 125 has the ability to monitor signals from a plurality of fluid level sensors or product meter pulses, so that multiple compartments of a tanker vehicle may be simultaneously monitored while several different products are being transferred.

In various systems of current art for storing, pumping and transferring petroleum, petrochemical or other similarly hazardous fluid products, additional monitoring and controlling apparatus well-known in the art may be utilized in addition to the functions of grounding verification and overfill and detection as shown in system 100. Additional signal input sources to the pump and valve controller 109 or batch controller preset 116 may be produced from vapor flow sensors, for example, or safe operation of a pump station for transferring petroleum or petrochemical products can only be ensured by a fail-safe detection, alert and control system that constantly monitors all critical functions of the product pumping and flow operation, both in the storage and delivery system and the tank vehicle. Such a system quickly alerts management to equipment malfunction and potential hazardous pump, valve or ground conditions. When a hazardous condition develops caused by a malfunction or misuse of equipment anywhere in the system, reaction time of the system for shutting down pumps or valves must be kept to an absolute minimum due to the large volume of fluid being transferred each second during normal operation of the fluid delivery system, and with the flow valve fully open. Because of the potential hazards in a petroleum or petrochemical fluid transfer operation, a possibility exists, should an overfill or ground loss situation occur, that adjacent loading lanes, continuing to operate the loading spots after shutdown of the lane with the overfill, may be affected by the resulting dangerous situation.

An improved method and apparatus is presented by the inventor for reliably and consistently monitoring the operations and conditions of critical systems in a fluid transfer operation, systems that may be in the product storage, pumping, delivery, metering or some other area, and/or for monitoring sensors on a tank vehicle. A control monitor unit is utilized to perform such functions, having the ability to shutdown or otherwise control critical operations in the least amount of time possible to avoid overfill, product leakage or unauthorized fluid transfer. Preferred embodiments of the present invention provide the improvements and enhancements in monitoring and control such as described above as desirable, and are described in further enabling detail below.

Figure 2:
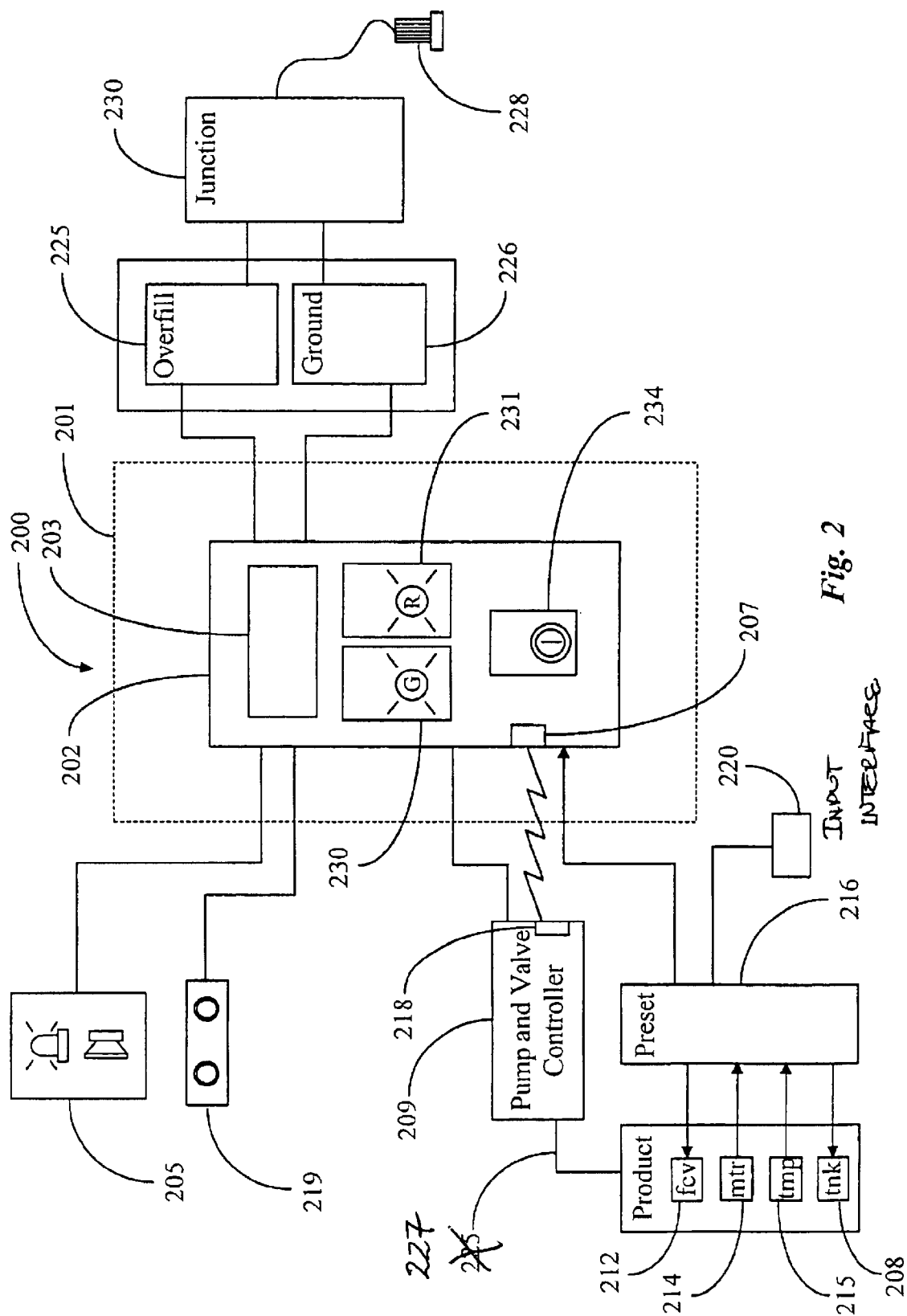
FIG. 2 is a block diagram of a fluid transfer operation and electronic monitoring and control system and a control monitor unit according to a preferred embodiment of the present invention.

FIG. 2 is a block diagram of a fluid transfer operation and electronic monitoring and control system and a control monitor unit according to a preferred embodiment of the present invention. The simplified block diagram of FIG. 2 shows a fluid storage, pumping and transfer operation similar to system 100 of FIG. 1, system 200 having many similar control and monitoring elements as those shown in the previously described operation and system of current art represented by FIG. 1. An overfill prevention unit 225 and ground detection unit 226 are likewise incorporated as safety devices in system 200, and are similarly connected to a junction 230 enabling connection between the circuitry of the monitoring and controlling units and plug assembly 228 for connection to a receptacle on the tank vehicle and receiving of signal inputs provided by sensors of the tank vehicle.

The monitoring and control or shutdown capability of system 200 is provided by overfill prevention unit 225 and ground detection unit 226 in the system shown, as in previous systems such as is shown for system 100 of FIG. 1. In this example, however, the inventor provides an additional control monitor 201 that serves as a centralized monitoring and control unit that provides many enhancements to previous and current systems, as will be described, having capability for reliably, consistently and intelligently monitoring functions and conditions of the fluid storage and pumping operation, and also having much broader control and system shutdown capability that greatly reduces the reaction time in shutting down the system once a problem signal is interpreted.

Control monitor 201 in this embodiment is a mountable unit similar in size and shape to that of a typical modem overfill prevention unit or static ground detection unit well-known in the industry, and is similarly encased in a standard protective enclosure also common in the industry. A central processor 202 is utilized in control monitor 201, and provides monitoring and controlling intelligence through firmware written specifically for its own operation. Control monitor 201 has circuitry providing connection between central processor 202 and the circuitry of overfill prevention unit 225 and ground detection unit 226 as shown in this simplified view. In other embodiment of the present invention additional circuitry may exist within control monitor 201 for connection of processor 202 to wiring for other similar signal input sources from additional units. For reasons of simplicity, however, such circuitry and units are not shown in this view.

Additional circuitry exists within control monitor 201 for connection of processor 202 to wiring that is connected to emergency pump shutdown buttons 219 which have a similar manual system shutdown function as those of FIG. 1. Circuitry is also present for a connection to pump and valve controller 209 and batch controller preset 216. An interface 220 enables data to be manually input into batch controller preset 216 by a driver, for example, The valve controller 209 and batch controller preset 216 of system 200 monitor or send control and pulsed signals to and from the fluid product storage and delivery systems, as is true in a typical application such as that of FIG. 1, and are shown connected through wiring to components related to the fluid product storage, pumping and delivery system and operation. Shown are examples of such product related components and again, for reasons of simplicity, the product components shown may represent a much larger number of components such as found in a typical application.

Examples shown of such product storage and pumping components are flow control valve 212 and a flow meter 214, a fluid temperature probe to 215 and a tank base valve 208, all having similar function and connectivity to batch controller preset 216 as the like components in system 100 of FIG. 1. However, in the system shown a connection 227 is utilized comprising a wiring system, standard in the industry, that provides a connection between the product pumping and transfer components and pump and valve controller 209. Although it is not shown in this diagram, a motor control apparatus similar to motor control 111 of FIG. 1 can be assumed to be connected between pump and valve controller 209 and pump operations in the product components block and receives pump command signals from pump and valve controller 209 and executes the commands to the appropriate product pumps.

In this embodiment of the present invention processor 202 of control monitor 201 may optionally communicate with pump and valve controller 209 through signals sent and received utilizing RF wireless signal propagation. A radio transmit system 207 is provided in this embodiment for the purpose of sending or receiving radio signals to pump and valve controller 209. Such signals may be control signals sent from control monitor 201 for controlling or shutting down pump and valve controller 209, or may be pulsed signals from a pump meter for monitoring by control monitor 201, or from some other signal source. A radio system 218 that is integrated with, or otherwise connected, to circuitry of pump and valve controller 209, as with that of control monitor 201, receives and/or transmits control or pulsed signals, enabling the radio communication link. In some embodiments a radio-frequency transmit and receive system may be integrated into the design of control monitor 201 and pump and valve controller 218, or may be a generic, commonly available system that is purchased separately and simply connected, using standard methods, to the separate control units.

The use of radio signal transmission in conjunction with control monitor 201 for control of the pump and valve controller 209, which is typically located near the vicinity of the loading operation, provides distinct advantages to systems of current and prior art that are connected through hard-wiring or Ethernet connections. For example, the greatly increased control range provided by such an arrangement enables a centralized and remote location to be chosen for control monitor 201, because the need for hard wiring or Ethernet connections to the pump and valve controller is eliminated. By locating control monitor 201 at a more distant, safer location away from the loading operation, at a remote monitoring station, for example, the safety to management and other pump station personnel is increased when an event occurs in presenting a hazard due to a product spill or vapor spray situation. Utilizing such a method also allows management personnel an ability to assess and react to a hazardous situation much quicker than is currently possible utilizing typical systems and methods because of the closer proximity of control monitor 201 to the management or monitoring personnel in a remote monitoring station. Generic radio transmit and receive systems that may be utilized with control monitor 201 and pump and valve controller 209 are also inexpensive and commonly available allowing pump station upgrades that are both economical and easy to install.

In a typical application in a system such as is represented by system 200, overfill prevention unit 225 is used in conjunction with ground detection unit 226 and, as a set, provides additional safety control and monitoring required for such an operation. In this example, a set comprising of one overfill prevention unit 225 and one ground detection unit 226 has the capability of monitoring and controlling from one to four individual sets of the various components for the pumping operation of one pump terminal. In some load lanes, however, as many as eight individual pump terminals may exist in a single loading lane. If such is the case, two sets of overfill prevention and ground detection units are utilized, each set monitoring and controlling four individual sets of pumps, valves, meters, and other related components.

Control monitor 201 greatly extends monitoring and control capability by providing a method for continuously monitoring the output signals from one or two sets of overfill prevention and static ground detection units, and by having the capability of monitoring from one to eight individual product meter pulses originating from meters 214, and a same number of associated pump commands sent from batch controller preset 216. The monitored product meter pulses may be from presets that are of either mechanical or electronic design. Control monitor 201, by having direct connection, either through standard wiring, Ethernet, or radio signal propagation, to pump and valve controller 209 and batch controller preset 216, provides control for a much broader range of pump, valve, or meter components. If the condition of a signal monitored by control monitor 201 indicates a problem or hazardous condition, whether or not the signal source is the overfill prevention or ground detection units, or from a controller or preset, the reaction time of the component or system receiving the resulting shutdown command signal from control monitor 201 is greatly reduced. In this manner, the amount of fluid product that continues to flow after the hazardous signal condition is interpreted by control monitor 201 and power has been cut to the associated pump and valve systems, is greatly reduced as compared to conventional systems not utilizing a control monitor 201, because additional connection circuitry is needed to accommodate sets of overfill prevention and ground detection units, each of which often controls separate pump, valve or terminal operations on separate connection circuitry. In such conventional systems the additional connection circuitry and components result in an indirect and inefficient signal path, adding to system reaction time in the event of a shutdown, while increasing the chance of malfunction or failure of components of the system.

Control monitor 201 is provided with a display 203, which is in this embodiment a liquid crystal display well known in the industry, but in alternative embodiment the type of display may vary. Display 203 is electronically connected to circuitry of processor 202 and is mounted in or on the housing of control monitor 201, in such a way, as will be subsequently shown in greater detail, that when control monitor 201 is mounted in its operating location, display 203 is clearly visible to the operator or other personnel monitoring the unit. Some signals received and interpreted by processor 202 from the various signal inputs from the pump and transfer system or control monitors are analyzed by processor 202 and displayed by display 203. For example, one such signal is received by processor 202 from a component of the pump terminal, such as a meter, and processor 202 displays the number of the pump that is currently in use utilizing display 203. Other indicators may also be displayed by display 203, such as blinking or otherwise animated flow indicators, product flow volume, in gallons, that occurs after a valve shutdown, and many other such indicators of operational status. In this way, periodic and accurate adjustment and tuning of the valves or pumps in the system may be performed based on such indicators displayed by display 203. Other indicators displayed by processor 202 through display 203 include but are not limited to those described, and may vary depending on different firmware that may be utilized by processor 202 in its operation.

Hazardous conditions that may develop in the operation of a petroleum or petrochemical fluid storage and transfer system such as system 201, conditions such as an overfill or static ground loss, for example, must be immediately known by management personnel, regardless of their whereabouts, as soon as it occurs. The condition must be made immediately apparent by visible and audible alarms to ensure that the condition is known. Control monitor 201 has a pair of status indicators, located and mounted below display 203, which provide a visible glow through a lens indicating status of critical conditions. For example, in the embodiment shown, status indicator 230 has a light behind a translucent green lens, and during normal operation when processor 202 interprets overfill and static ground signals as normal and indicating no problem, the light in indicator 203 remains in the on position, eliminating the green lens and providing a visual confirmation to monitoring personnel of the normal and safe operation of the system. An alarm indicator is provided by status indicator 231 in this embodiment, located below display 203, next to status indicator 230, and his utilized in this example for providing the visual signal that an unsafe condition exists or is developing. As an example, if processor 202 detects the signals from ground detection unit 226 and the pulsed flow signals from batch controller preset 216 as normal, but the signal from overfill prevention unit 225 is deviating from its normal condition, status indicator 231 provides the visible alarm to monitoring personnel using a flashing light behind a red lens. By utilizing indicators 230 and 231, a rapid visual confirmation can be made by management personnel that the system is operating normally and safely, and when a hazardous condition develops it is immediately made visually apparent.

The circuitry of processor 202 in the embodiment shown also has the capability of connecting to, and sending signals to an alarm system 205, which is located external to control monitor 201. Alarm system 205 may be a visual flashing light or beacon, an audible alarm, or a combination, a may be located in multiple areas remotely from control monitor 201. In this manner the level of awareness of management and other monitoring or operating personnel to the operating status of the system is, again, greatly increased.

A keyed reset switch 234 is provided in this embodiment for the purpose of allowing a manual reset of the operation, settings or display characteristics, for example of control monitor 201. Reset switch 234, when actuated, is designed to override signals received by control monitor 201 from sources elsewhere in the system, enabling only specified personnel with the proper key, the ability to shutdown the system, for example, by overriding the system. Other alternative embodiments of the present invention may utilize a different control mechanism than keyed reset switch 234, one example being a keypad where a multi-digit code is entered for actuation of the reset action. Regardless of the mechanism the control reset function described for this embodiment allows only personnel qualified for resetting the system to do so.

Figure 3B:
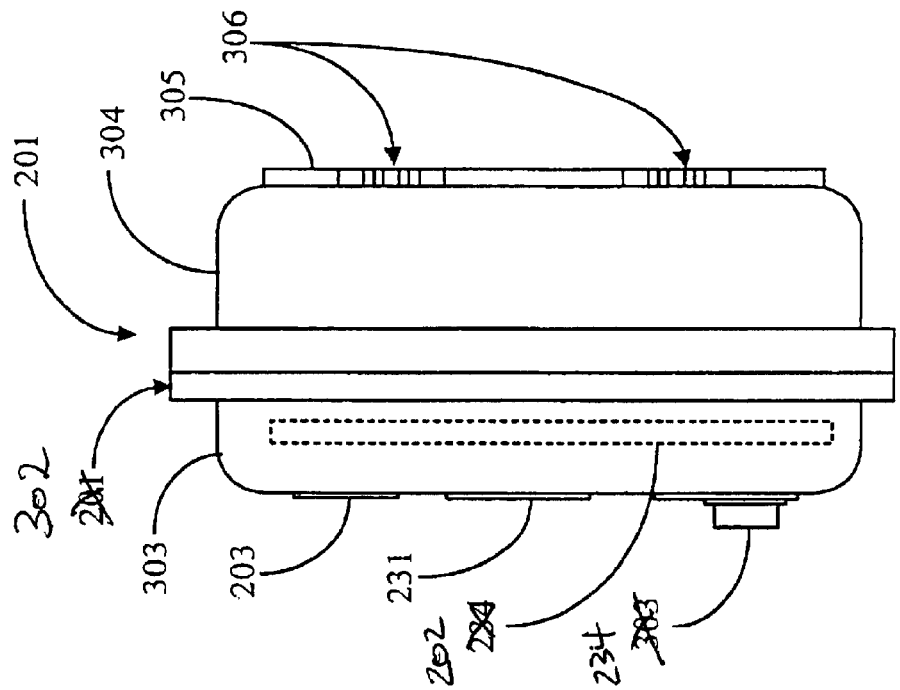
Figure 3A:
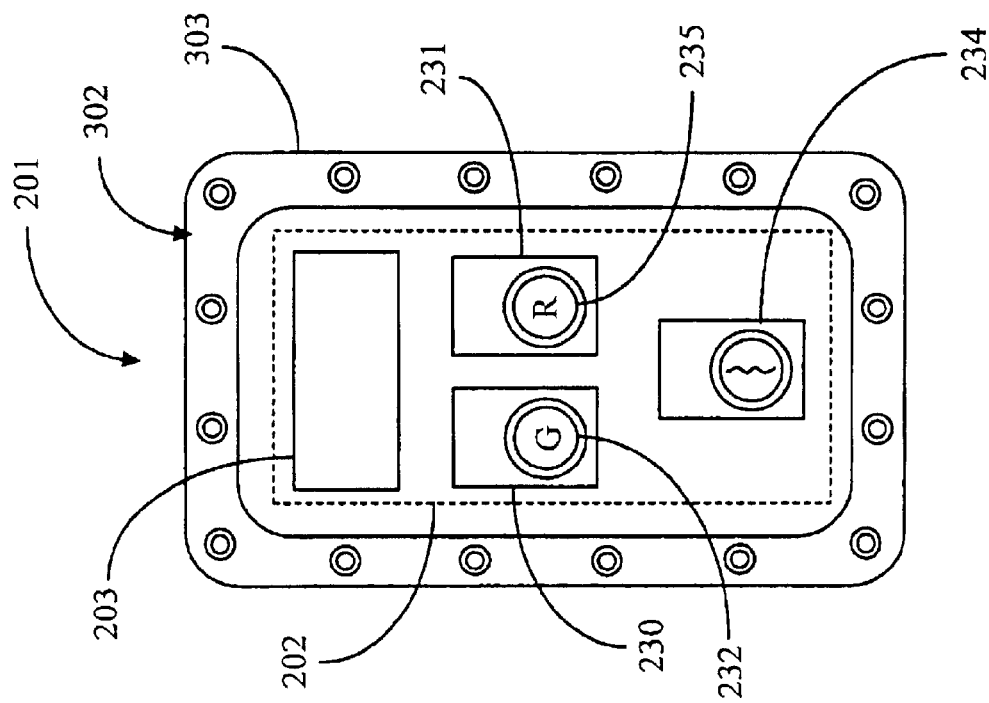
FIG. 3a is a front view of the control monitor unit of FIG. 2 according to a preferred embodiment of the present invention.

FIG. 3a is a front view of control monitor 201 of FIG. 2 according to a preferred embodiment of the present invention. As referenced above in FIG. 2 the enclosure utilized by control monitor 201, containing processor 202, various circuitry, interfaces and other components as described, is of a design well-known in the art, commonly referred to as NEMA enclosures in the industry, allowing control monitor 201 to be mounted as a unit on a load rack, similarly to other units such as an overfill prevention or ground verification unit. Enclosure 302 comprises two enclosure sections, one of which is hidden from view, each having one side with a flanged surface designed to fit and attach together utilizing standard attachment methods, thereby forming the protective enclosure for control monitor 201. In such a way, components and circuitry within control monitor 201 may be easily accessible by detaching and separating the two enclosure halves. The front face of an enclosure section 303 is seen in this view, being the front section of the two halves forming enclosure 302. In different embodiments the type of enclosure used to contain or attach components of control monitor 201 may differ from that shown, and may also have varying degrees of protection from elements such as weather, chemicals, fuel and so on. The type of enclosure described for control monitor 201 has been determined by the inventor to be of the design most effective and efficient for its purpose in a preferred embodiment.

Display 203 is located in the upper central portion of the front face of control monitor 201, providing the best possible visibility for monitoring when control monitor 201 is mounted on the load rack or other location. Display 203 has electronic connection to circuitry of processor 202, which, as it is shown in the hidden view, is mounted within the enclosure of control monitor 201. Status indicators 230 and 231 are also located on the front face of control monitor 201, a clearly visible location, centered directly below display 203. Status indicator 230 has, in this embodiment, light-emitting diodes (LEDs) or some other visible light source connected to circuitry of processor 202, and during system operation, when processor is 202 interprets all input signals as normal, processor 202 causes the light source to continuously emit light which is reflected and clearly visible through a green-colored lens 232 that is mounted directly above the light source. By utilizing status indicator 230 in such a way, clear visual confirmation is given, at a glance, to personnel monitoring control monitor 201, that systems monitored and controlled by control monitor 201 are functioning properly and load conditions are normal for all delivery terminals and related components for that load lane.

Status indicator 231 is also located on the front face of control monitor adjacent to status indicator 230, and equally visible in its location directly below display 203. Status indicator 231 in this embodiment also has LEDs or other light source that are used for indicator 230, and has electronic connection to circuitry of processor 202 mounted within control monitor 201. Status indicator 231 has a red-colored lens 235, similar in size and shape to that used for status indicator 230 that is mounted directly above the light source and through which light is reflected when emitted from the light source. When processor 202 of control monitor 201 interprets input signals from the system as indicating a hazardous condition, fluid leak or other problem situation, the light source of indicator 231 shines intermittently or continuously and reflects through the red-colored lens 235, providing a clearly visible alarm indicator to monitoring personnel. At the instant the signal interpretation occurs indicating the problem and the warning light of status indicator 231 goes on, control monitor 201 is responding to the source of the problem by controlling or shutting down specific functions related to the problem, and management personnel are more quickly able to respond to the situation due to the visual warning alert given by status indicator 231.

Keyed reset switch 234 can be seen in this view also mounted on the front face of control monitor 201 a center location just below status indicators 230 and 231, providing a readily accessible method for manually resetting control monitor 201. In this embodiment reset switch 234 is a standard keyed switch electronically connected to circuitry of processor 202 of control monitor 201 that, when actuated with a key, allows a manager, for example, to override the single inputs, settings and preventive actions of control monitor 201, and reset the functions of control monitor 201 to their normal settings.

In a typical configuration in a load rack operation, a load lane, which may have eight individual sets of product delivery pumps and associated components, is controlled by one control monitor 201. In such a configuration each additional lane in the loading operation is controlled by an additional control monitor 201 unit. Control monitor 201 is designed to be easily integrated into a load rack operation that is already monitored and controlled by a set or sets of overfill prevention and ground detection units, such as overfill prevention unit 225 and ground detection unit for system 200 of FIG. 2. It is the interpretation of the combined conditions or presence of the signals sent from both the overfill prevention and ground detection units that determines the control action and warning notification that processor 202 of control monitor 201 will execute. If a load lane controlled by control monitor 201 has the current maximum of eight individual sets of product delivery pumps and components, two sets of overfill prevention and ground detection units will be utilized for that lane, each set monitoring and controlling a total of four sets of product delivery components. In such an arrangement control monitor 201, having the same standard enclosure and similar mounting method as other conventional monitoring or controlling units, may be mounted along with those units at the load rack, or in other configurations may be mounted in a location remote from the load rack operations, particularly when radio-frequency propagation is the method of communication between control monitor 201 and a valve and pump controller.

FIG. 3b is a side view of control monitor 201 of FIG. 3a. In this view, control monitor 201 is rotated 90 degrees from FIG. 3a, now clearly showing enclosure 302 comprising of the enclosure sections 303 and 304, fitted and attached together at the flanged surfaces. A hidden view of the edge of processor 202, mounted within enclosure 302 illustrates its proximity to display 203, status indicator 231, and keyed reset switch 234, all of which can be shown mounted in their location on the front face of control monitor 201. A mounting plate 305 formed or otherwise attached to housing 302 at a location on the backside of enclosure section 304. Mounting plate 305 has a total of four notches 306, only two of which are seen in this view, that form a rectangular pattern in their arrangement, and are provided for the purpose of mounting control monitor 201 to a load rack or other location. A standard fastener designed for this purpose is inserted through each notch 306, and is securely fastened to mounting location. The described mounting method for control monitor 201 is similar to that used for mounting other control monitor units, such an overfill prevention unit or ground detection unit.

Figure 3D:
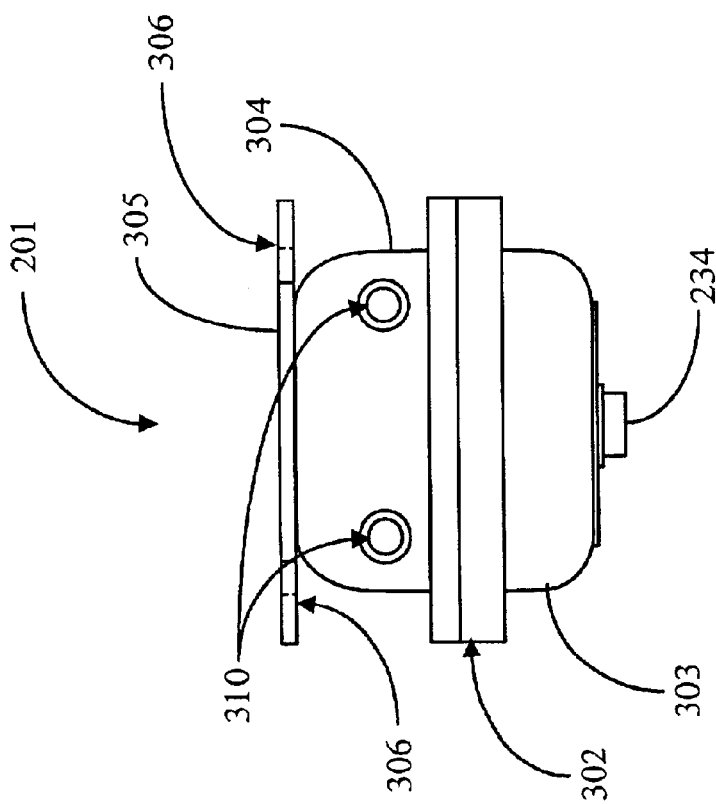
Figure 3C:
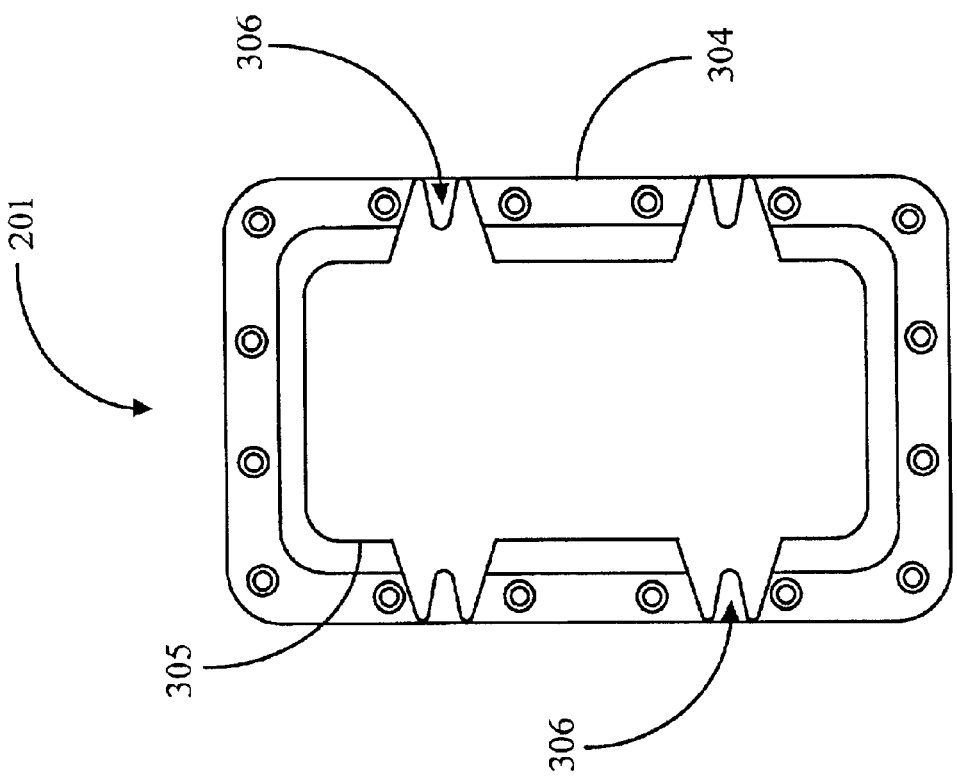

FIG. 3c is a rear view of control monitor 201 of FIG. 3a. In this view control monitor 201 is rotated 180 degrees from FIG. 3, showing the backside of control monitor 201 and providing a clear view of mounting plate 305 and a rectangular arrangement of notches 306. The back edge of the flanged surface of enclosure section 304 is also seen in this view. Alternative embodiments of the present invention may utilize a method other than that shown for mounting control monitor 201 to the load rack or other location that is chosen. For example, mounting plate 305 may have a different number of notches 306, possibly arranged in a pattern different from shown, or may utilize mounting holes instead of notches. A variety different mounting methods may be utilized depending on the application where control monitor 201 is used, and the mounting location chosen.

FIG. 3d is a bottom view of control monitor 201 of FIG. 3a. The rounded edges of enclosure sections 303 and 304 are apparent in this view and the overall shape of control monitor 201 can be seen with enclosure sections 303 and 304 fitted together as designed. Mounting plate 305 can be seen attached to the backside up enclosure section 304 and two of notches 306 are seen at either edge of mounting plate 305. Entrance taps 310 are provided in this embodiment for routing the cables, used for connection to the external control, monitoring and sensing systems and apparatus with which control monitor 201 communicates, into enclosure 302 for connection to circuitry within control monitor 201. Entrance taps 310, in this embodiment, accommodate standard NMT cable connection inserts commonly used in the industry, and may also have one or more similar entrance taps (not shown) located on the edge opposite of that shown in FIG. 3, or the top edge of housing 302, for the purpose of passing additional connection cables or wiring through housing 302 for connection to components within control monitor 201. The reset switch 234 is seen in this view mounted to and extending out from the front enclosure section 303.

The functions of processor 202 involving the reading of input signals from various systems and sensors of the loading operation, and interpreting the signals to determine the appropriate command action to take, if any, and then instantly executing the control command to the affected systems, is achieved by firmware contained within processor 202. Control monitor 201 continuously monitors from one to two sets of safety equipment comprising of overfill prevention units 225 and ground detection units 226, and up to eight each of individual product meter pulses and individual preset pump commands, and intelligently interprets all of the various input signals to determine the appropriate set of global control signals or commands to be sent, with the ability to shut down a proportionately large number of systems simultaneously. Such complex monitoring and control functions, as well as additional functions providing improvements to systems of prior art, are performed by control monitor 201 through intelligence within processor 202, enabled by a set of innovative firmware routines developed specifically for use with control monitor 201. The firmware routines utilized are developed for control monitor 201 working in conjunction with a set or sets of overfill and ground control monitors, as well as the other systems or devices normally monitored or controlled in a typical application such as has been described above. Further, it will be apparent to the skilled artisan that the numbers of devices and systems monitored are arbitrary in the present example, and could differ from the numbers used in the example.

Figure 4A:
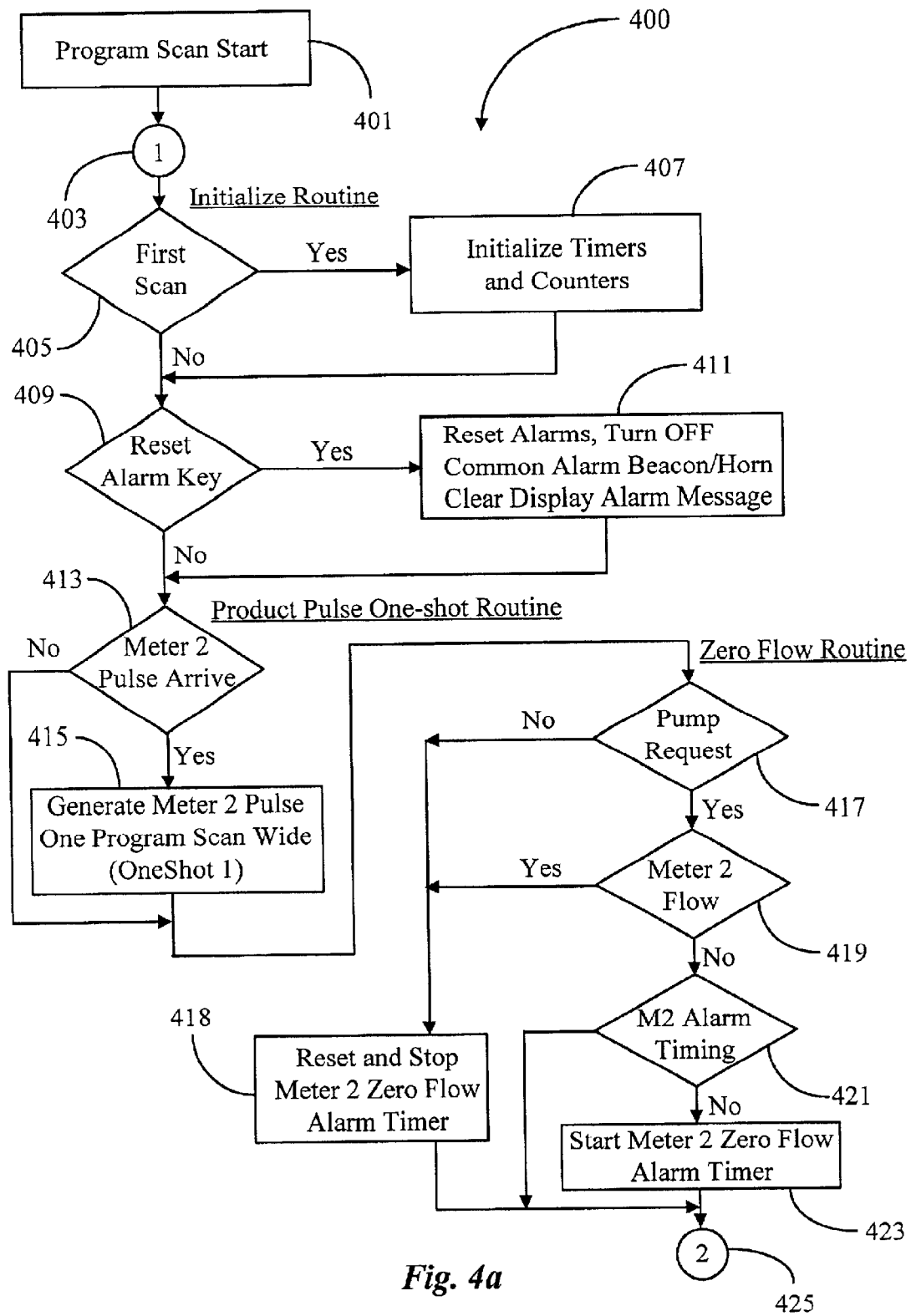
FIG. 4a is a flow diagram illustrating logic of firmware routines of control monitor 201 in a preferred embodiment of the invention.

FIG. 4a is a flow diagram illustrating logic of some firmware routines of control monitor 201 in an embodiment of the invention. The logic flow illustrated represents the firmware that drives the function of processor 202 of control monitor 201. Firmware 400 comprises a number of steps and branching conditions and instructions that direct the logic flow through the correct series of functions depending on the various conditions. As shown in FIG. 4a, the beginning point, or program start portion, of the firmware program is shown as step 401, which begins the first section of the firmware logic represented by section 403. The firmware portion begins with an initialization routine on all of the program variables, then, in step 405, a determination is made if the routine is a first program scan. If so, the process of initializing timers and counters begins in step 407. If a determination is made in step 405 that it is not the first scan, step 409 checks if the reset alarm key switch has been activated. If the reset alarm key switch has been activated, step 411 begins by resetting the alarms of control monitor 201, turning off a common connected alarm system external to control monitor 201, such as a flashing beacon and horn system, for example, and clearing any alarm message displayed by display 203 of control monitor 201.

If a reset alarm key switch has not been activated, a product pulse routine begins; referred to by the inventor as a one-shot routine, beginning in step 413 where a check is made whether or not a product pulsed signal from a flow meter has just arrived. If so, a product pulse scan routine, referred to as one-shot 1 routine by the inventor, begins in step 415, otherwise, the firmware program begins the next routine for checking zero-flow conditions. The zero-flow routine begins in step 417 where it is determined whether or not a flow meter has signaled a request for a product pump to be turned on, and if it has, a check is made in step 419 if the flow meter is measuring actively flowing product. If no product pump request has been received by processor 202 from the flow meter, the action of resetting and stopping the second meter zero-flow alarm timer takes place in step 418. In step 419, if it is determined that the flow meter is not actively flowing product step 421 checks the operation of the zero-flow alarm timer of the flow meter to determine whether or not the timer is on. If the zero-flow alarm timer of the meter is not timing step 423 starts the alarm timer for the flow meter, otherwise the firmware arrives at section 425 to begin the second logic phase of firmware 400.

Figure 4B:
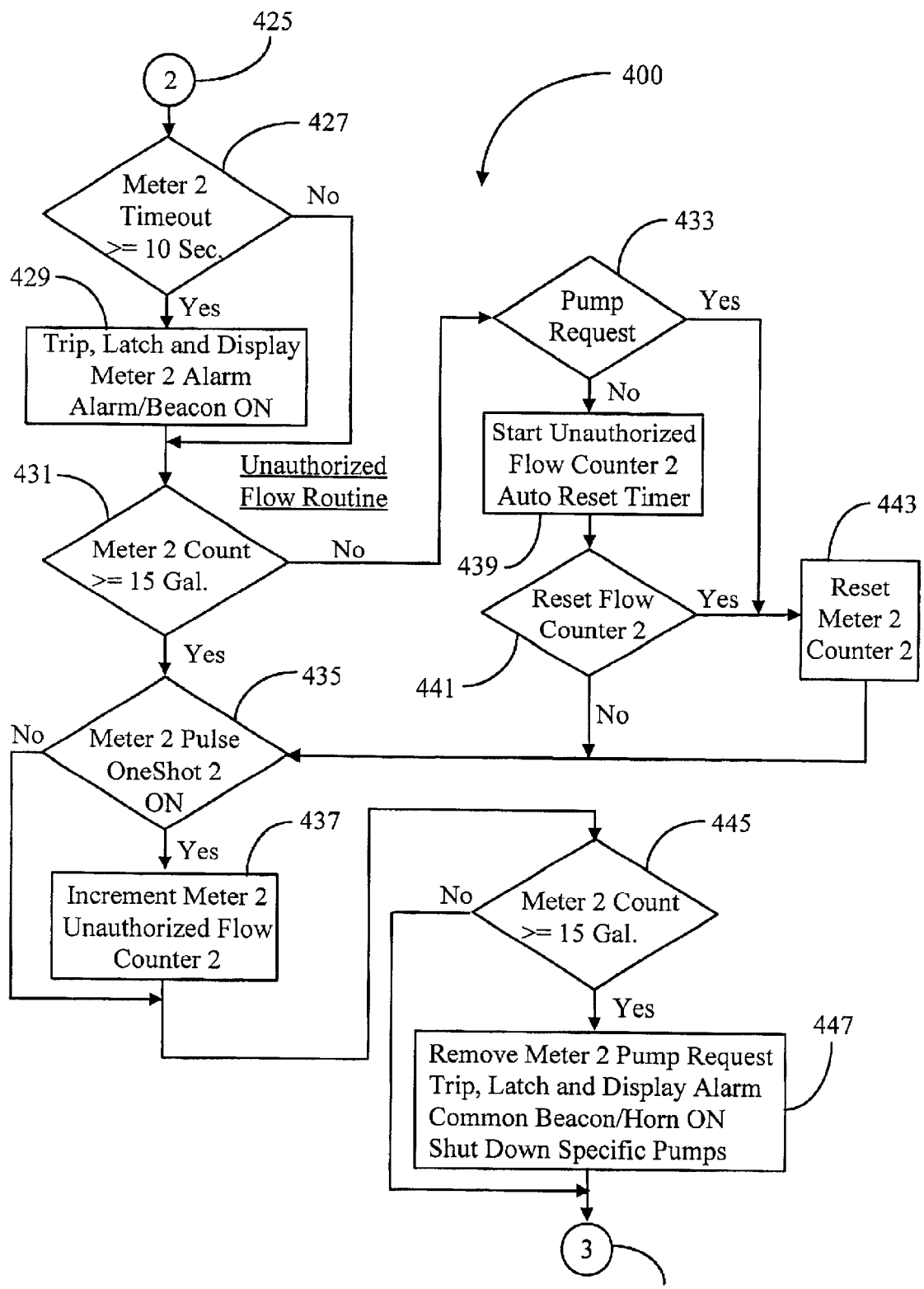
FIG. 4b is a flow diagram illustrating additional logic of the firmware routines of control monitor 201.

FIG. 4b is a flow diagram illustrating additional logic of the firmware routines of control monitor 201, and is a continuation of the flow logic of FIG. 4a, beginning at section 425 to be in the second logic phase of firmware 400. The first step 427 in this phase firmware 400 checks if the zero-flow alarm timer of the flow meter has timed out, making the determination based on if timing of the alarm timer has ceased for a period of time greater than or equal to 10 seconds. If the duration of the timeout meets or exceeds 10 seconds, the zero-flow alarm is tripped, latched and indicated by display in step 429, and also in this step, an external visible and audible alarm system is activated, such as a horn and light beacon. If the alarm timer timeout does not exist, or is of duration of less than 10 seconds, a next routine begins in firmware 400 that is used for checking unauthorized product flow. The unauthorized flow routine begins in step 431 where a flow count is checked for the flow meter, and it is determined whether or not the unauthorized flow counter reads a volume greater than or equal to 15 gallons. If the reading is less than 15 gallons of firmware checks, and step 433, if the pump motor for the flow meter has sent a request for the pump to be turned on. If the pump request has been sent, in step 443 the unauthorized flow counter for the flow meter is reset, and step 435 begins where it is determined whether or not a routine is taking place, referred to by the inventor as one-shot 2 routine.

If a request to turn the product pump on has not been sent from the flow meter as determined in step 433, an automatic reset timer is started for the flow counter in step 439. Step 441 then determines if the current time is appropriate for starting the automatic reset timer for the flow counter. If conditions are appropriate for starting the flow counter reset timer, resetting of the timer takes place in step 443, otherwise the determinations of step 435, as described earlier, take place. If the conditions of the product pulse signals from the flow meter, in step 435, are such that it is determined that the one-shot 2 routine is running, the unauthorized flow counter for the flow meter is incremented in step 437. It is then determined in step 445 whether or not the count for the unauthorized flow counter meets or exceeds 15 gallons. If the conditions of the product pulse signals are such that it is determined in step 435 that the one-shot 2 routine is not running, step 445 begins for measuring the unauthorized flow count. In step 445 it is determined that the flow count as reported by the flow counter meets or exceeds 15 gallons, step 447 begins where the product pump request for the flow meter is removed, the unauthorized flow alarm is tripped, latched and indicated as such by display 203 of control monitor 201, and a common external beacon and horn alarm system, for example, is activated. Unauthorized product flow is stopped in this step by a signal sent to the pump controller in the system to instantly shutdown the specific pump or pumps where the unauthorized flow is occurring. The pump controller shuts down the product pumps by interrupting the power to the systems. Firmware 400 then arrives at the next phase represented by section 449, which begins another firmware routine.

Figure 4C:
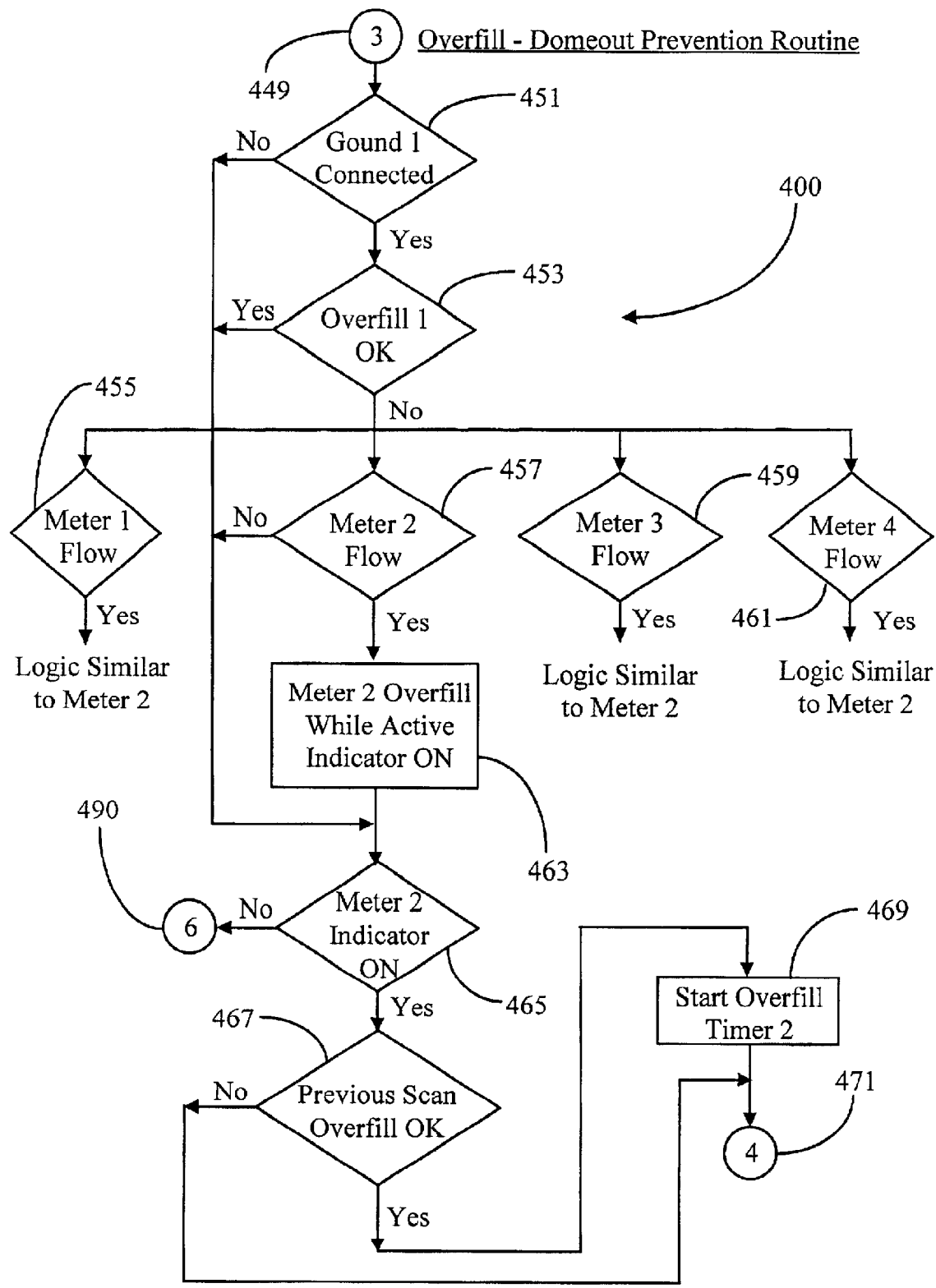
FIG. 4c is a flow diagram illustrating additional logic of the firmware routines of control monitor 201.

FIG. 4c is a flow diagram illustrating additional logic of the firmware routines of control monitor 201, and represents a next phase in firmware 400 where a safety routine begins for detecting the conditions of product overfill and static ground. The routine, referred to by the inventor as the overfill dome out prevention routine, begins at section 449 and has a first step 451 that determines, based on a signal sent from the ground detection unit of the system, if a static ground exists for the specific pump terminal and tanker being loaded at the terminal. If static ground is detected in step 451, an assessment of the operation of the overfill prevention unit of the system is made in step 453. If, in step 451, it is determined that a proper ground condition does not exist for that pump terminal, step 465 checks if an indicator for the flow meter is on signify an "overfill while active" condition.

If the overfill signals in step 453 indicate no problem, step 465 begins, otherwise, step 457 checks if product is actively flowing from the product flow meter. If it is determined in step 457 that product is actively flowing then the indicator for "overfill while active" for the product meter is turned on in step 463. If it is determined in step 457 that product is not actively flowing, then step 465 begins by checking if the "overfill while active" indicator is on. In step 465, it is determined that the "overfill while active" indicator is operating, step 467 checks what the conditions of the overfill signals were in the previous scan in step 453, and, in step 467 if signal conditions indicated no problems, step 469 starts an overfill timer for the product pump, arriving at the next phase of firmware 400 represented by section 471. If conditions of the overfill signals of the previous scan did indicate problems, then step 469 is bypassed and a next phase of firmware 400 begins at section 471. If, in step 465, it is determined that the "overfill while active" indicator is not on, a phase in firmware 400 is reached indicated by section 490 where a routine will begin to run for the LCD display, being described later in greater detail.

Referring now to step 457, which determines if product is or is not actively flowing for a particular meter, the same flow logic that is used by firmware 400 beginning at step 457, being dependent on the results of the flow determination made there, is also used for additional meters monitored and controlled by the firmware. In the example shown three additional meters are monitored and controlled by firmware 400, each utilizing a step similar to step 457. A step 455 begins the logic flow for a first meter, step 457 as described for a second meter, a step 459 for a third meter, and step 461 for a fourth meter. For example, if in step 455 for a first flow meter, if it is determined that product is actively flowing for that meter step 463 begins for that meter, and if product is not actively flowing, then step 465 begins for that meter. The same logic is applied to all four of the meters represented in the flow diagram.

Figure 4D:
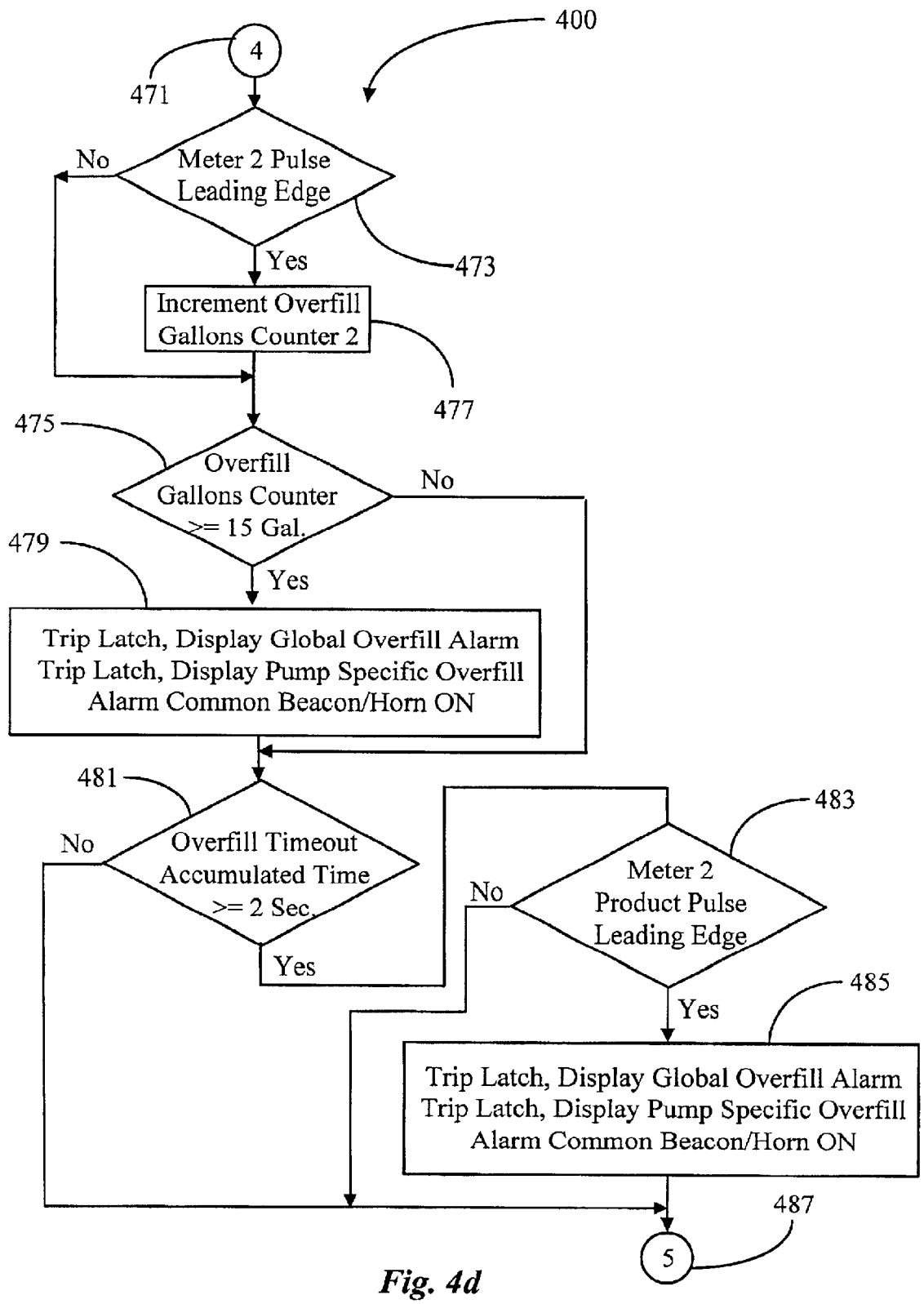
FIG. 4d is a flow diagram illustrating additional logic of the firmware routines of control monitor 201.

FIG. 4d is a flow diagram illustrating additional logic of the firmware routines of control monitor 201. The logic flow for firmware 400 shown in this diagram begins at section 471 where in step 473 a determination is made of the product pulse from the flow meter if the leading edge of the product pulse has been received. If it is determined that the leading edge of the product pulse from the flow meter is present, then step 477 increments the overfill gallons counter for the product pump, and step 475 begins to determine whether or not the count from the gallons counter indicates a flow volume greater than or equal to 15 gallons. If the leading edge of the product pulse is not present, step 477 is bypassed and step 475 begins as described. In step 475, it is determined that the count for the overfill gallons counter meets or exceeds 15 gallons, then step 479 begins where a global overfill alarm system is tripped, latched and indicated as such by display 203 of control monitor 201, shutting down all product pumps. A pump specific overfill alarm is also tripped, latched and displayed in this step, and a common external beacon/horn alarm is also activated at this time.

The next logic step in this phase of firmware 400 occurs in step 481 where it is determined whether or not the overfill timer for the product meter has timed out for a period of accumulated time greater than or equal to 2 seconds. If two seconds or more have elapsed during a timeout then step 483 begins which determines whether or not the product pulse from the meter is at its leading edge. If, in step 481, the timeout period is determined to be less than two seconds of then a phase of firmware 400 represented by section 487 is reached which will be subsequently described in detail. If the product pulse from the flow meter is determined to be at the leading edge in step 483, then a step 485 begins, comprising an identical set of actions to that of step 479. Once said actions are completed firmware 400 reaches the next phase indicated by section 487.

Figure 4E:
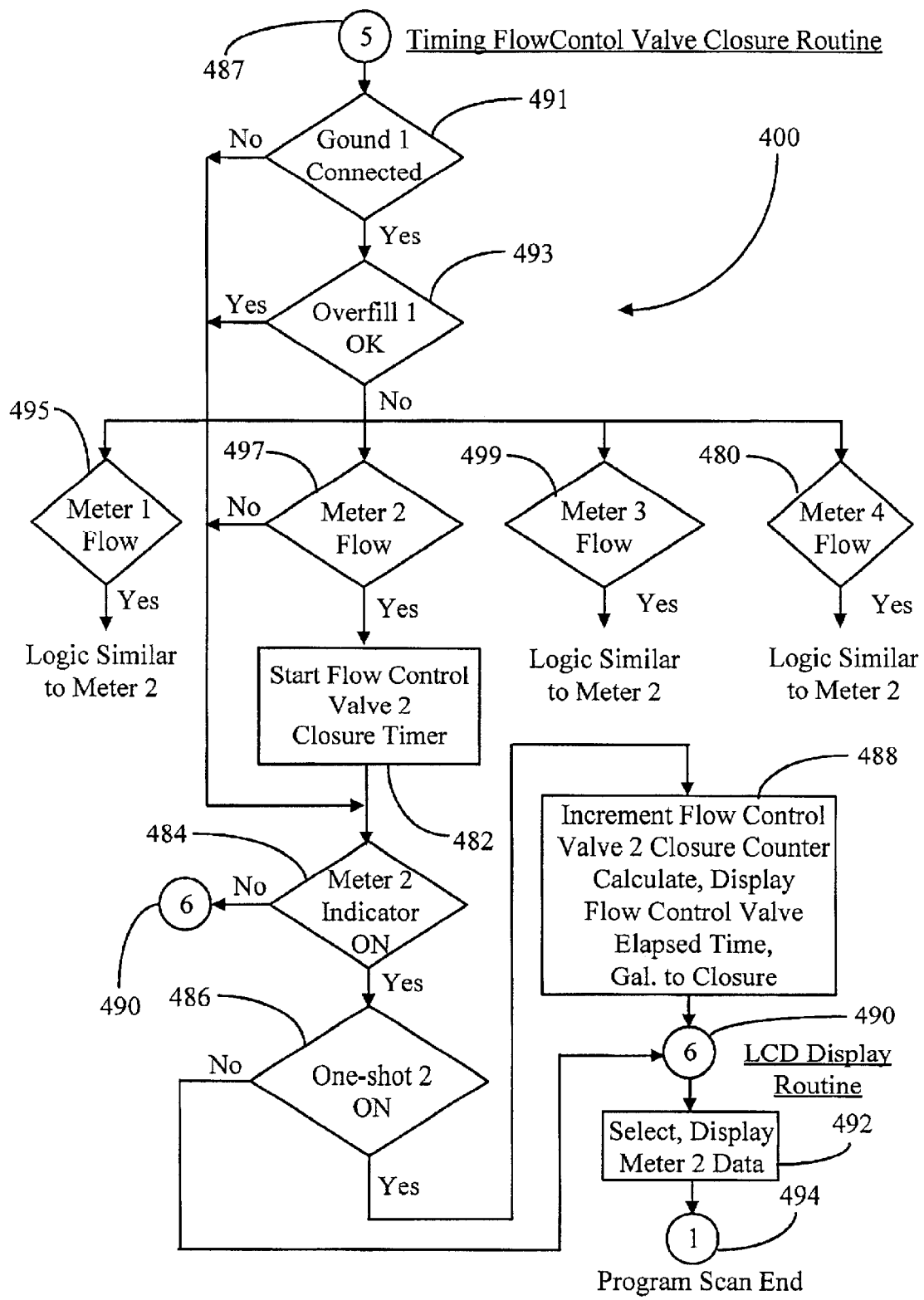
FIG. 4e is a flow diagram illustrating additional logic of the firmware routines of control monitor 201.

FIG. 4e is a flow diagram illustrating additional logic of the firmware routines of control monitor 201. At the phase represented by section 487 in this view, firmware 400 begins a timing routine for the closure of a specific flow control valve. The timing flow control valve closure routine begins in step 491 where a verification is made of the static grounding condition for the equipment being monitored and controlled, by interpretation of a signal sent by a ground detection unit in the system. If the static grounding signals in step 491 indicate that proper grounding exists, step 493 checks the signals from an overfill prevention unit for a problem indication. In step 491, if the signals from the ground detection unit indicate that a static ground is weak or not present, step 484 begins which determines if the "overfill while active" indicator is on.

In step 493, if the signals from the overfill prevention unit indicate that no problem exists, step 484 begins as described above. If, in step 493, the overfill signals do indicate a problem, a check is made in step 497 whether or not there is actively flowing product for that meter. As is true for the logic flow illustrated by FIG. 4c for the overfill dome out prevention routine, a step identical to step 497, and similar following logic are used for each of an additional three meters, as shown by their respective steps 495 for a first meter, step 497 for a second meter as described, step 499 for a third meter and step 480 for a fourth meter.

In step 497 if it is determined that the flow meter is actively flowing product, a closure timer for the flow control valve is started in step 482. If it is determined in step 497 that at the flow meter there is not product actively flowing, step 484 determines if the "over the while active" indicator is on. In step 484, if it is determined that the "overfill while active" indicator is on, then step 486 begins which determines if the product pulse from the flow meter is at the leading, or rising edge, meaning that the one-shot 2 routine is on. If indications are, in step 484 that the "overfill while active" indicator is not on, the next phase of the flow logic of firmware 400 is reached, indicated as section 490, which begins a LCD display routine.

If it is determined in step 486 that the product pulse is at the leading edge, and the one-shot 2 routine is on, step 488 begins by incrementing the flow control valve closure counter, and calculating and displaying the elapsed time and number of gallons before closure of the flow control valve. If it is determined in step 486 that the product pulse is not at the leading edge and the one-shot 2 routine is not running, the next phase beginning the LCD display routine represented by section 490 is reached. The LCD display routine at section 490 of firmware 400 begins in step 492 where various data from the product flow meter is displayed by display 203 of control monitor 201. A phase in firmware 400, represented by section 494, ends the program scan which then may begin again at the program scan start for the running of an initialization routine.

It will be apparent to the skilled artisan that many variations may exist within the firmware utilized by the processor of control monitor 201, depending on the application and environment in which control monitor 201 operates, and the various equipment that may be used in the operation. For example, a different number of product pumps, associated components and ground or overfill detection units may be monitored and controlled by firmware 400, and firmware 400 may be designed to control functions of the central processor of control monitor 201, so that control monitor 201 may operate in conjunction with safety equipment such as overfill prevention and ground detection units of different types from a variety of manufacturers. There are many ways that functionality may be provided by the firmware in the processor, while accomplishing essentially the same purpose or function within the scope and spirit of the present invention. Similarly, there are many ways that the firmware may be programmed and structured by different programmers, or the same programmer, while still accomplishing essentially the same purpose or function. Such variations should be considered within the scope of the invention, and the invention is limited only by the claims that follow.

What is claimed is:

1. A supervisory Independent Secondary Shutoff Control System (system) that interfaces with at least one stream of fluid transfer in a fluid transfer facility, each stream of fluid transfer with (i) flow control device that is either an start/stop switch or a batch controller system (BCS) that includes an optional preset in communication with a meter, and a flow control valve connected to the meter; (ii) a pump and valve controller system (PVS), in communication with the BCS, the PVS with a secondary flow control valve connected to the flow control valve, a pump connected to the secondary flow control valve and to a product storage tank, and a motor control connected to the pump; (iii) a Emergency Shut Down or Emergency Fuel Shut Off circuit (ESD) connected to the PVS; (iv) a ground detection unit connected to the PVS; and (v) an overfill detection system connected to the PVS, wherein the BCS is adapted to send operation signals to the PVS and the PVS is adapted to respond to operation signals from the BCS wherein the operation signals include signals to start the pump, signals to open the secondary flow control valve, or both of these signals, the system comprising (A) a monitoring system (MS) in communication with (B) a supervisory pump and valve control system (SPVS), or (C) the ESD circuit, or both the MS including
- a input channel connected to the meter;
- an input channel connected to the overfill-detection system, the ground-detection-unit, or both;
- an output channel;
- executable logic routines adapted to process signals received through any of the input channels; and
- executable logic routines adapted to sending signals through the output channel to the SPVS, to sending signals through the output channel for activating the ESD circuit, or to sending signals through the output channel to both; and the SPVS connected to the PVS and adapted to
- receiving signals from the MS;
- enabling or disabling pumping in response to the signals; and
- opening or closing the secondary flow control valve in response to the signals.

2. The system of claim 1 wherein opening or closing the secondary flow control valve includes enabling or disabling opening of the secondary flow control valve.

3. The system of claim 1 wherein the executable logic routines of the MS are adapted to sending signals through the output channel to the ESD circuit for activating the emergency shutdown operation.

4. The system of claim 1 wherein the executable logic routines of the MS are adapted to sending signals through the output channel to the SPVS.

5. The system of claim 1 further comprising a wireless communication system adapted to providing at least part of the communication between the MS and the SPVS.

6. The system of claim 4 wherein the wireless communication system is a radio frequency communication system.

7. The system of claim 1 further comprising a wired communication system adapted to providing at least part of the communication between the MS and the SPVS.

8. The system of claim 1 adapted such that a failure in the fluid transfer facility equipment, a failure in the system, or a failure in both disables pumping, disables valve opening, or disable both for at least one stream of fluid transfer in the fluid transfer facility.

9. The system of claim 1 wherein the MS additionally includes other output channels and input channels connected to other indicators in the fluid transfer facility.

10. The system of an claim 8 wherein an input channel is operably connected to the flow control device for receiving a flow-authorized status and wherein the executable logic routines are further adapted to process signals on the input channels.

11. The system of claim 8 wherein
- one of the input channels is a pump-run channel operably connected to the SPVS for receiving a pump run status,
- one of the input channels is a pump-authorized channel operably connected to the flow control device for receiving a pump-authorized status, and
- the executable logic routines are further adapted to process signals from the pump-run channel and the pump-authorized channel.

12. The system of claim 8 characterized in that the system, through continued execution of the executable logic routines, monitors the conditions of the fluid transfer facility, and automatically disables pumping, disables opening of the flow control valve, disables opening of the secondary flow control valve, initiates system lockout, or any combination of these when the system detects pre-determined conditions on one or more of the input channels.

13. The system of claim 12 additionally comprising a reset switch wherein the executable logic routines are additionally adapted to respond to the reset switch signal, resetting a system lockout.

14. The system of claim 11 further comprising a wireless communication system adapted to providing at least part of the communication between the MS and the SPVS.

15. The system of claim 8 further including local or remote alert equipment and the MS further includes other executable logic routines related to alert signaling wherein execution of the alert signaling routines causes the MS, in response to conditions of the transfer facility, in response to conditions of the system, or in response to both, to send a signal through at least one output channel wherein the alert equipment is adapted to respond to the signal.

16. The system of claim 1 further including a display for displaying status and conditions of the fluid transfer facility.

17. The system of claim 1 further comprising one or more inputs for immediately enabling or disabling one or more functions or operations in the fluid transfer facility.

* * * * *